United States Patent
Jamali et al.

(10) Patent No.: US 12,393,092 B2
(45) Date of Patent: Aug. 19, 2025

(54) GRIN LC LENS DESIGN WITH VARIABLE RESISTANCE ELECTRODE

(71) Applicant: Meta Platforms Technologies, LLC, Menlo Park, CA (US)

(72) Inventors: Afsoon Jamali, Issaquah, WA (US); Changwon Jang, Kirkland, WA (US); Zhimin Shi, Bellevue, WA (US); Sho Nakahara, Bothell, WA (US); Sandro Pintz, Menlo Park, CA (US); Amit Bhowmick, Kent, OH (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/162,175

(22) Filed: Jan. 31, 2023

(65) Prior Publication Data
US 2024/0036432 A1    Feb. 1, 2024

Related U.S. Application Data

(60) Provisional application No. 63/392,361, filed on Jul. 26, 2022.

(51) Int. Cl.
*G02F 1/29* (2006.01)

(52) U.S. Cl.
CPC .......... *G02F 1/29* (2013.01); *G02F 2201/122* (2013.01); *G02F 2202/16* (2013.01)

(58) Field of Classification Search
CPC .. G02F 1/29; G02F 2201/122; G02F 2202/16; G02F 1/292
See application file for complete search history.

(56) References Cited

U.S. PATENT DOCUMENTS

| | | | | |
|---|---|---|---|---|
| 2012/0262663 | A1* | 10/2012 | Chin | G02B 3/14 349/200 |
| 2017/0052396 | A1* | 2/2017 | Cheng | G02F 1/134336 |
| 2018/0143505 | A1* | 5/2018 | Campbell | G03H 1/0248 |
| 2023/0093313 | A1* | 3/2023 | Bjornard | G03B 17/12 359/265 |

* cited by examiner

*Primary Examiner* — Michael H Caley
*Assistant Examiner* — David Y Chung
(74) *Attorney, Agent, or Firm* — Greenberg Traurig, LLP

(57) ABSTRACT

A device includes a primary electrode, a secondary electrode overlapping at least a portion of the primary electrode, and a liquid crystal layer disposed between the primary electrode and the secondary electrode, where the primary electrode has a spatially variable electrical resistance.

19 Claims, 7 Drawing Sheets

GRIN LC LENS DESIGN WITH VARIABLE
RESISTANCE ELECTRODE

CROSS-REFERENCE TO RELATED APPLICATION

This application claims the benefit of priority under 35 U.S.C. § 119(e) of U.S. Provisional Application No. 63/392,361, filed Jul. 26, 2022, the contents of which are incorporated herein by reference in their entirety.

BRIEF DESCRIPTION OF THE DRAWINGS

The accompanying drawings illustrate a number of exemplary embodiments and are a part of the specification. Together with the following description, the drawings demonstrate and explain various principles of the present disclosure.

Figure 1:
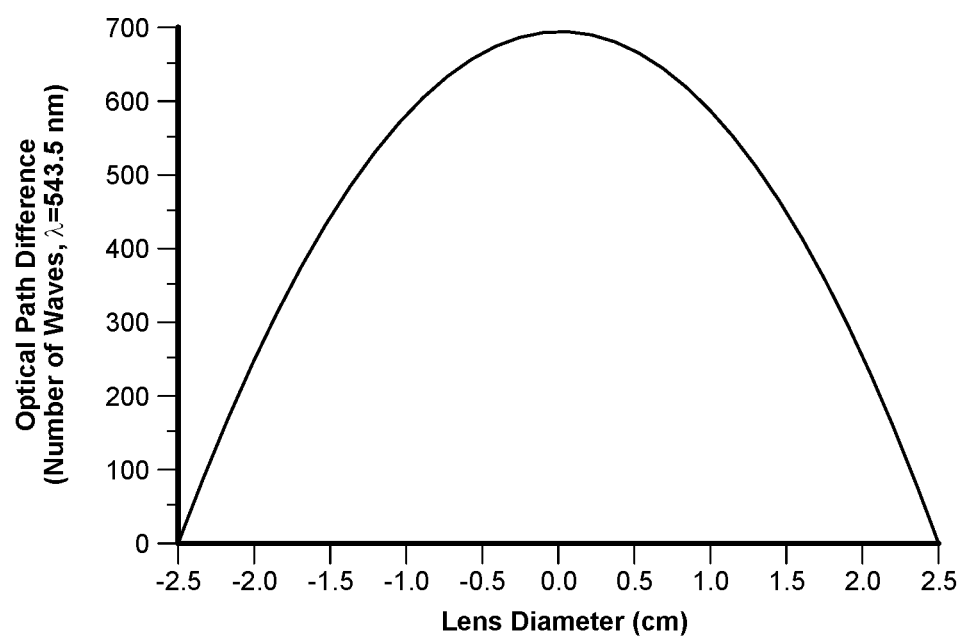
FIG. 1 shows the parabolic profile of the optical path in an example GRIN LC lens according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

Across various optical engineering applications including eyeglasses, contact lenses, and vision correction elements in augmented reality (AR) and virtual reality (VR) systems, liquid crystal (LC) lenses may provide a number of advantages due to their electrically tunable focusing capability, where the associated optical mechanism is based on a spatially localized modulation of light speed resulting from LC molecular orientations driven by applied electric fields.

In such context, and as will be appreciated, the realization of a continuous distribution of phase retardation across larger aperture (>10 mm) LC lenses may be challenged by the limited birefringence (<0.8) of LC materials as well as their mechanically compliant nature. In some embodiments, a gradient-index configuration may be used to provide tunability of focus quality.

Gradient-index (GRIN) optics refers to a branch of optics where optical effects are produced by a spatial gradient in the refractive index of a material. A gradual refractive index change may be used to manufacture lenses having planar surfaces, for example, or to reduce aberrations in imaging applications. In an LC lens having an axial gradient configuration, the refractive index may vary along the optical axis of an inhomogeneous medium such that surfaces of constant index are planes that are oriented perpendicular to the optical axis. In a radial/cylindrical refractive index gradient configuration, on the other hand, the index profile may vary continuously from a centerline of the optical axis to the periphery along the transverse direction in such a way that surfaces of constant index are concentric cylinders located about the optical axis. Hybrid GRIN LC lenses having both an axial and a radial/cylindrical refractive index gradient configuration are also contemplated.

GRIN-type LC lenses may be configured to exhibit a gradient distribution of refractive index in response to a spatially inhomogeneous electric field that is applied across the LC layer(s). As such, the lens power of a GRIN-type LC lens may be continuously tunable. In some instantiations, there may be a continuous variation of the refractive index within the lens material. An LC lens may be configured in both planar and non-planar (e.g., concave or convex) geometries.

In comparative systems, a tunable architecture may include a plurality of discrete, ring electrodes formed over the LC layer(s) within the optical aperture of the lens. During operation, a different voltage may be applied to each electrode, which may be used to locally tune the refractive index of the LC material. However, the patterning of multiple electrodes may create manufacturing challenges and also induce performance liabilities, including a loss of transmission and the generation of optical artifacts such as haze and/or ghosting due to angular diffraction arising from inter-electrode gaps.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

Notwithstanding recent developments, it would be advantageous to provide a manufacturable and economical GRIN LC lens design that is configured to operate without the generation of significant haze or ghosting, or a loss of transmission. The present disclosure thus relates to a GRIN LC lens design having a spatially tunable refractive index, and more particularly to a GRIN LC lens having a single variable resistance conductive electrode. The single electrode may have a continuous profile and may be optically transparent and disposed over one or more LC layers within the optical aperture of the lens. The elimination of a discrete ring multi-electrode configuration may simplify manufacturing and improve performance, enabling substantially haze-free function over a large area aperture.

By way of example, a GRIN LC lens may include a primary electrode, a secondary electrode overlapping at least a portion of the primary electrode, and a liquid crystal layer disposed between the primary electrode and the secondary electrode. In accordance with further examples, a GRIN LC lens may include a liquid crystal layer, and a primary electrode disposed over the liquid crystal layer, where the primary electrode has a contiguous structure with a spatially variable electrical resistance.

The primary electrode may be a contiguous layer having a spatially-variable electrical resistance, and may include one or more transparent conducting oxides (TCOs) such as indium oxide, tin oxide, indium tin oxide (ITO), indium gallium zinc oxide (IGZO), and the like. The secondary electrode may be configured as a ground electrode. In some embodiments, the electrodes (e.g., the primary electrode and the secondary electrode) may have a thickness of approximately 1 nm to approximately 1000 nm, with an example thickness of approximately 10 nm to approximately 50 nm. In particular embodiments, a thickness of the primary electrode may be variable and may change as a function of position within the optical aperture of a lens.

In some embodiments, a GRIN LC lens may further include a layer of a dielectric or insulating material located between the primary electrode and the LC layer. The presence or absence of a dielectric or insulating layer may be used to locally vary the magnitude or direction of an electric field applied to the LC layer, and correspondingly tune the LC layer's refractive index and/or birefringence.

As disclosed herein, the formation of a continuous transparent electrode having a variable resistance may be achieved using a variety of methods and structures. According to some embodiments, the electrode resistance may be controlled spatially by engineering the doping profile within or across the electrode, i.e., at the atomic level. Doping changes the electron and hole carrier concentrations of a host material at thermal equilibrium. A doped electrode layer may be p-type or n-type. As used herein, "p-type" refers to the addition of impurities that create a deficiency of valence electrons, whereas "n-type" refers to the addition of impurities that contribute free electrons.

The type and amount of doping may be controlled during and/or after electrode formation. By way of example, printing techniques such as ink jet printing may be used to locally deposit different electrode chemistries having a desired dopant concentration. According to further examples, ion implantation, e.g., in conjunction with photolithographic masking, may be used to locally define a doping profile within a previously-formed electrode. A doping profile may vary along a radial dimension of an LC lens, for example.

According to further embodiments, an electrode may be configured as an optical composite material. A composite electrode may include a regular or irregular distribution of domains (i.e., of a second phase) that locally influence the resistivity of the electrode.

A further approach may include forming an electrode having a variable structure along its thickness dimension. Such an electrode may be continuous in the x-y plane and accordingly avoid the formation of haze due to gaps in the electrode architecture across the aperture of the lens. Such a variable electrode structure may include an electrode having a variable thickness. The phase profile in such a configuration may be responsive to both an applied voltage and an applied frequency.

According to still further embodiments, a refractive index tunable LC layer may be achieved by applying a voltage to a patterned electrode where adjacent portions of the electrode within the x-y plane (e.g., ring electrode architecture) are capacitively coupled via an intervening patterned insulator. Without wishing to be bound by theory, strong capacitive coupling may be achieved in examples where the dielectric constant of the insulator is much greater than the dielectric constant of the LC material.

In addition to, or in lieu of, locally defining the structure of the electrode itself, a voltage applied across the LC layer may be manipulated by incorporating a patterned or otherwise structured dielectric layer between the electrode and the LC. For instance, the primary electrode may be continuous, whereas the insulator layer may be patterned. Such a patterned insulator layer may include a spatially variable thickness, which may cause spatially variable capacitive coupling between the LC layer and the primary electrode. As a result of controlled capacitive coupling, a refractive index gradient may be obtained.

According to a further embodiment, a difference in coupling strength may also be achieved by varying the thickness of an LC substrate, e.g., a glass substrate. Photolithography in combination with dry etching, for example, may be used to locally define the substrate thickness and accordingly allow for local adjustments in the capacitance of an associated cell.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-9, detailed descriptions of GRIN LC lens designs and their methods of manufacture. The discussion associated with FIGS. 1-7 relates to the structure and properties of example GRIN-type LC lenses having a variable resistance electrode. The discussion associated with FIGS. 8 and 9 relates to exemplary virtual reality and augmented reality devices that may include one or more GRIN LC lenses as disclosed herein.

Referring to FIG. 1, shown is a plot of optical path difference versus lens diameter for a representative LC lens. The desirable parabolic profile is a characteristic of a tunable GRIN LC lens.

Figure 2:
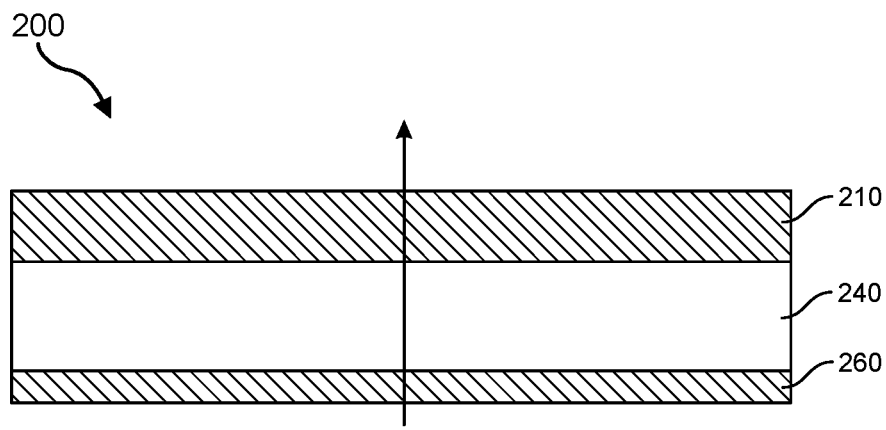
FIG. 2 illustrates an example GRIN LC lens having a liquid crystal layer disposed between a planar variable resistance electrode and a planar ground electrode according to some embodiments.

Referring to FIG. 2, shown is a schematic cross-sectional view of a GRIN LC lens including a variable resistance electrode. Lens 200 includes a primary electrode 210, a secondary electrode 260 overlapping at least a portion of the primary electrode 210, and a liquid crystal layer 240 disposed between the primary electrode 210 and the secondary electrode 260. Primary electrode 210 may be disposed directly over the LC layer 240, and LC layer 240 may be disposed directly over the secondary electrode 260. Primary electrode 210 may be configured as a variable resistance electrode and secondary electrode 260 may be configured as a ground electrode.

Figure 3:
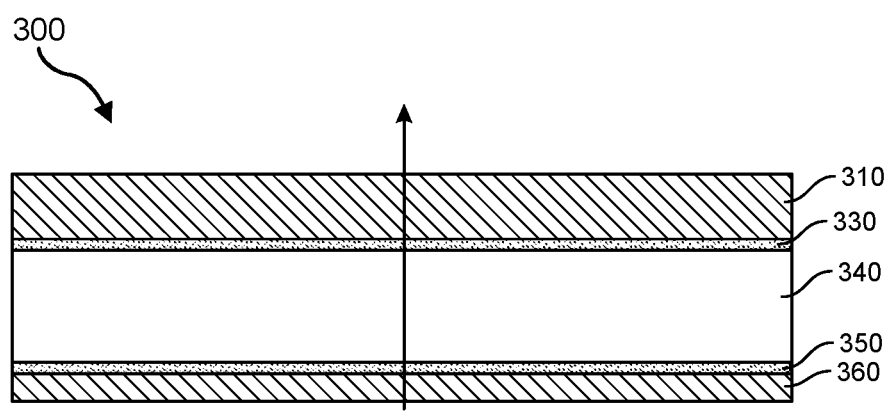
FIG. 3 illustrates an example GRIN LC lens having a liquid crystal layer disposed between a variable resistance electrode and a ground electrode according to further embodiments.

Referring to FIG. 3, shown is a schematic cross-sectional illustration of a GRIN LC lens having a variable resistance electrode. GRIN LC lens 300 includes a primary electrode 310, a secondary electrode 360 overlapping at least a portion of the primary electrode 310, and a liquid crystal layer 340 disposed between the primary electrode 310 and the secondary electrode 360. Insulating layers 330, 350 may be disposed between the primary electrode 310 and the liquid crystal layer 340 and between the liquid crystal layer 340 and the secondary electrode 360, respectively. Insulating layers 330, 350 may include an optical quality polymer, such as polyimide. In the illustrated embodiment, primary electrode 310 may be configured as a variable resistance electrode and secondary electrode 360 may be configured as a ground electrode.

Figure 4:
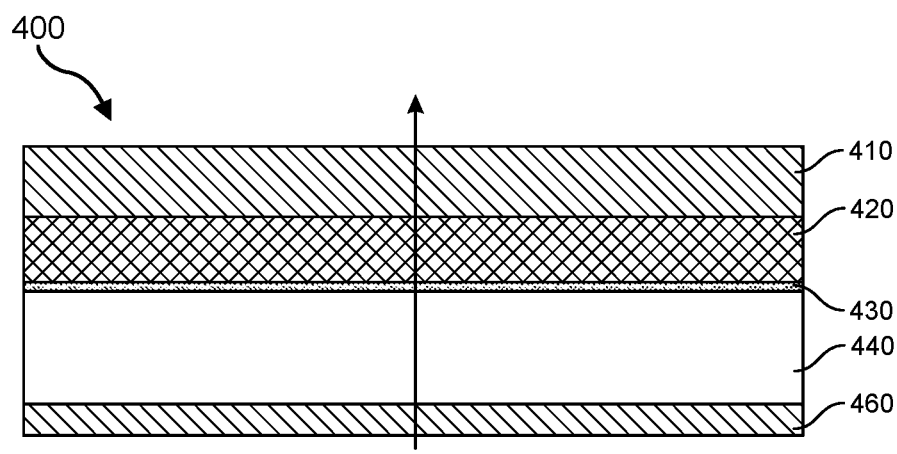
FIG. 4 illustrates an example GRIN LC lens having a liquid crystal layer and a dielectric layer disposed between a variable resistance electrode and a ground electrode according to certain embodiments.

Turning to FIG. 4, shown is a schematic cross-sectional illustration of a GRIN LC lens including a variable resistance electrode. GRIN LC lens 400 includes a primary electrode 410, a secondary electrode 460 overlapping at least a portion of the primary electrode 410, and a liquid crystal layer 440 disposed between the primary electrode 410 and the secondary electrode 460. A dielectric layer 420 and an insulating layer 430 may be disposed between the primary electrode 410 and the liquid crystal layer 440. Dielectric layer 420 may include silicon dioxide, for example, although further dielectric materials are contemplated, and insulating layer 430 may include an optical quality polymer, such as polyimide. In the illustrated embodiment, primary electrode 410 may be configured as a variable resistance electrode and secondary electrode 460 may be configured as a ground electrode.

Figure 5:
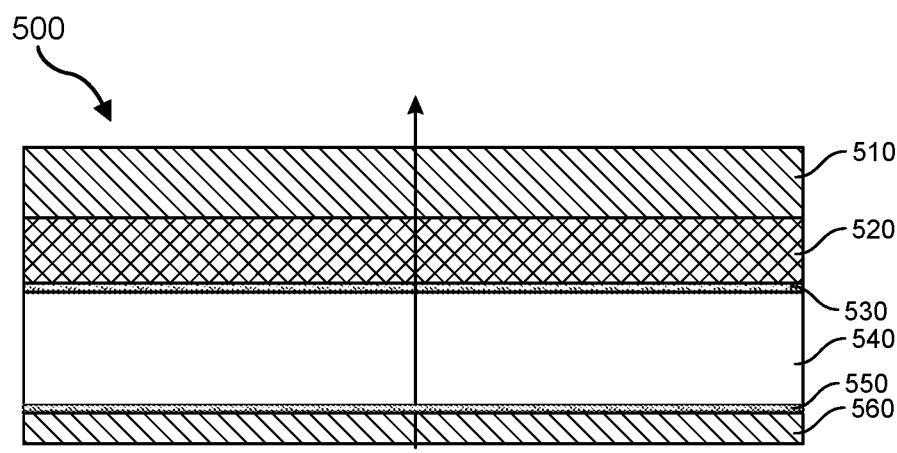
FIG. 5 illustrates an example GRIN LC lens having a liquid crystal layer and a dielectric layer disposed between a variable resistance electrode and a ground electrode according to further embodiments.

Referring to FIG. 5, shown according to further embodiments is a schematic cross-sectional illustration of a GRIN LC lens including a variable resistance electrode. GRIN LC lens 500 includes, from top to bottom, a primary electrode 510, a dielectric layer 520, a primary insulating layer 530, a liquid crystal layer 540, a secondary insulating layer 550, and a secondary electrode 560. As in the previous embodiment, dielectric layer 520 may include silicon dioxide and insulating layers 530, 550 may include an optical quality polymer, e.g., polyimide, although additional dielectric and insulating materials are contemplated.

Figure 6A:
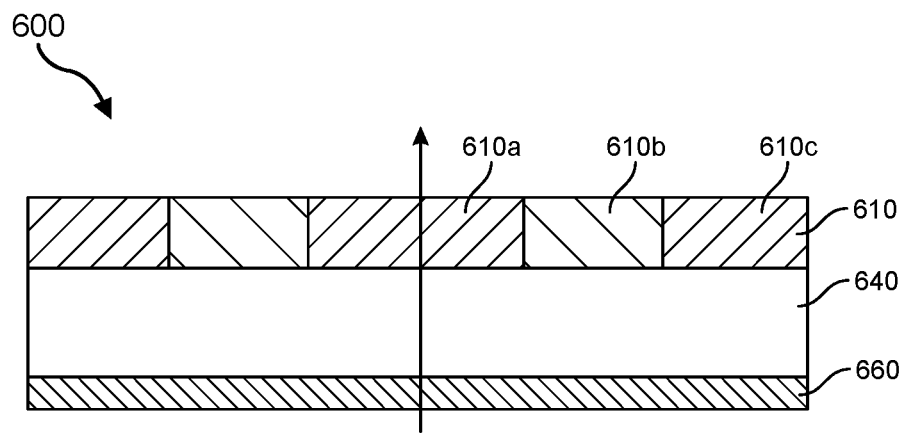
FIG. 6A and FIG. 6B illustrate (A) an example GRIN LC lens having a liquid crystal layer disposed between a segmented variable resistance electrode and a planar ground electrode and (B) a top-down plan view of the segmented variable resistance electrode according to some embodiments.
Figure 6B:
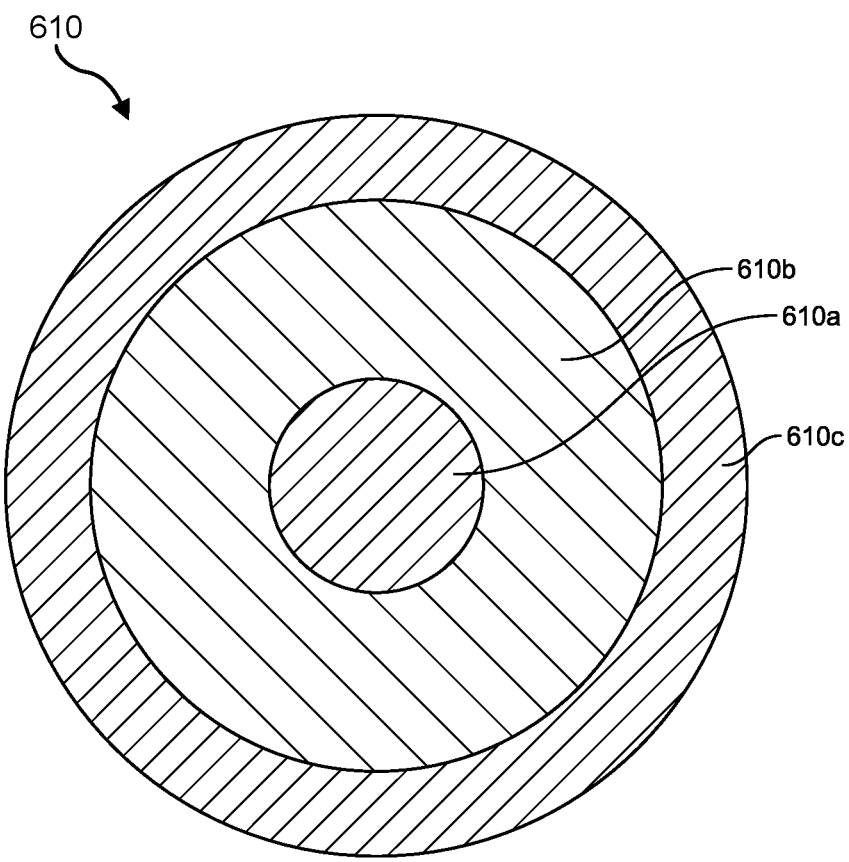

A further embodiment of a GRIN LC lens including a variable resistance electrode is shown in the cross-sectional and plan view illustrations of FIG. 6. Lens 600 includes a primary electrode 610, a secondary electrode 660 overlapping at least a portion of the primary electrode 610, and a liquid crystal layer 640 disposed between the primary electrode 610 and the secondary electrode 660. Primary electrode 610 may include a central segment 610a, a first annular segment 610b, and a second annular segment 610c. The electrode material within each electrode segment 610a, 610b, 610c may be arranged to locally control the electrical resistance of the primary electrode 610 within each segment. For example, an electrode composition within each of the central segment 610a, the first annular segment 610b, and the second annular segment 610c may be different. FIG. 6B is a top-down plan view showing the configuration of the electrode segments 610a, 610b, 610c.

Although three concentric and contiguous electrode segments are illustrated in FIG. 6, it will be appreciated that a primary electrode may include a fewer number of electrode segments, e.g., 2 segments, or a greater number of electrode segments, e.g., 4 to 10 or more segments. Moreover, plural electrode segments need not necessarily have a circular shape or fixed dimensions. In some examples, electrode segments may have an oval, square, or rectangular shape.

Figure 7:
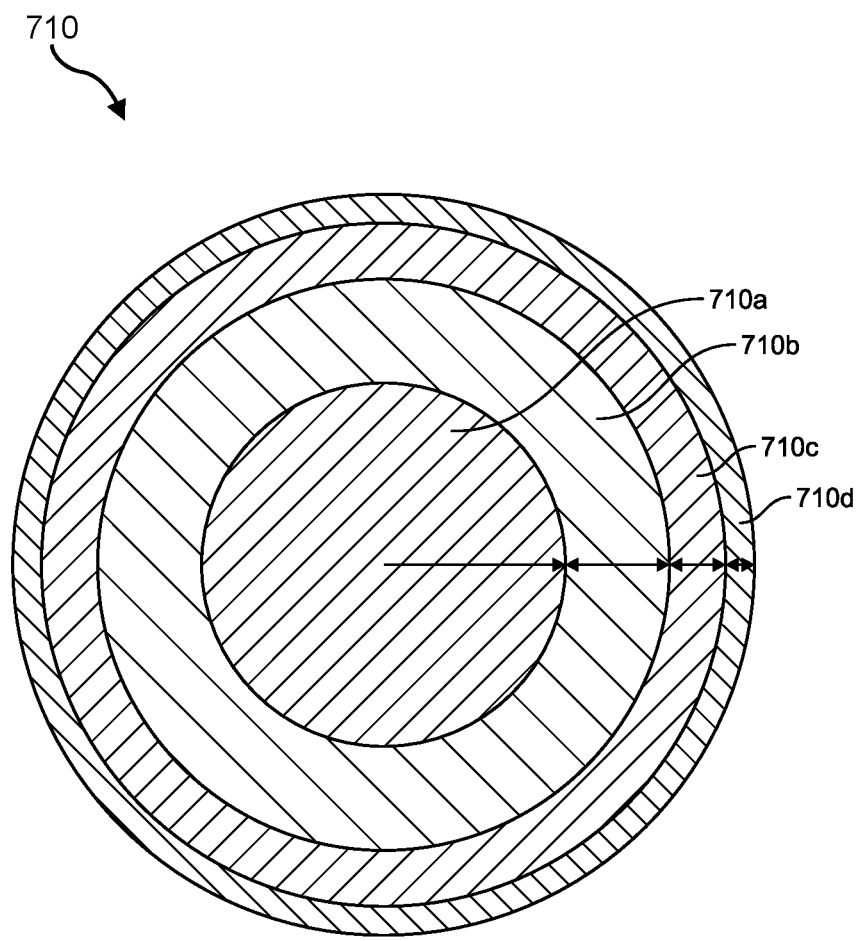
FIG. 7 is a top-down plan view of a planar variable resistance electrode having plural concentric segments with variable dimensions along a radial dimension according to some embodiments.

Referring to FIG. 7, shown is an example configuration of a variable resistance electrode. Variable resistance electrode 700 includes a central segment 710a, a first annular segment 710b, a second annular segment 710c, and a third annular segment 710d. As illustrated, a dimension of each respective segment may be variable, e.g., along a radial direction. For instance, each successive electrode segment from the center to the edge of the lens may have a progressively narrower width as shown by the arrows.

A gradient-index (GRIN) liquid crystal (LC) lens includes a variable resistance electrode. The GRIN LC lens is configured to exhibit a gradient distribution of refractive index in response to a spatially inhomogeneous electric field that is applied across the LC layer. By incorporating a variable resistance into a single electrode, manufacturing and performance challenges associated with comparative plural discrete ring electrode configurations may be avoided, including the creation of optical artifacts such as haze and ghosting.

The variable resistance electrode may be optically transparent and disposed over one or more LC layers within the optical aperture of the lens. Various approaches may be used to form an electrode having a spatially variable resistance, including doping and deposition techniques, and the introduction of secondary phases to form an optical composite material.

EXAMPLE EMBODIMENTS

Example 1: A device includes a primary electrode, a secondary electrode overlapping at least a portion of the primary electrode, and a liquid crystal layer disposed between the primary electrode and the secondary electrode, where the primary electrode has a spatially variable electrical resistance.

Example 2: The device of Example 1, where the primary electrode has a physically continuous structure.

Example 3: The device of any of Examples 1 and 2, where the primary electrode includes a plurality of concentric regions and the electrical resistance is substantially constant within each respective concentric region.

Example 4: The device of any of Examples 1-3, where the primary electrode is compositionally inhomogeneous.

Example 5: The device of any of Examples 1-4, where the primary electrode has a spatially variable doping profile.

Example 6: The device of any of Examples 1-5, where the primary electrode includes a plurality of concentric regions and the composition of the primary electrode is substantially constant within each respective concentric region.

Example 7: The device of any of Examples 1-6, where the primary electrode is optically transparent.

Example 8: The device of any of Examples 1-7, where the primary electrode includes a transparent conductive oxide.

Example 9: The device of any of Examples 1-8, where the primary electrode has a spatially variable thickness.

Example 10: The device of any of Examples 1-9, where the liquid crystal layer is planar.

Example 11: The device of any of Examples 1-10, including a dielectric layer disposed between the primary electrode and the liquid crystal layer.

Example 12: The device of Example 11, where a dielectric constant of a dielectric material within the dielectric layer is greater than a dielectric constant of a liquid crystal material within the liquid crystal layer.

Example 13: The device of any of Examples 11 and 12, where the dielectric layer includes silicon dioxide.

Example 14: The device of any of Examples 1-13, further including a dielectric layer disposed between the secondary electrode and the liquid crystal layer.

Example 15: A liquid lens includes a liquid crystal layer and a primary electrode disposed over the liquid crystal layer, where the primary electrode has a contiguous structure having a spatially variable electrical resistance.

Example 16: The liquid lens of Example 15, where the electrical resistance of the primary electrode varies across a radial dimension of the lens.

Example 17: A method includes forming a liquid crystal layer and forming a primary electrode over the liquid crystal layer, where the primary electrode has a spatially variable electrical resistance.

Example 18: The method of Example 17, where the liquid crystal layer is planar.

Example 19: The method of any of Examples 17 and 18, where forming the primary electrode includes ink jet printing.

Example 20: The method of any of Examples 17-19, including forming a dielectric layer over the liquid crystal layer prior to forming the primary electrode.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
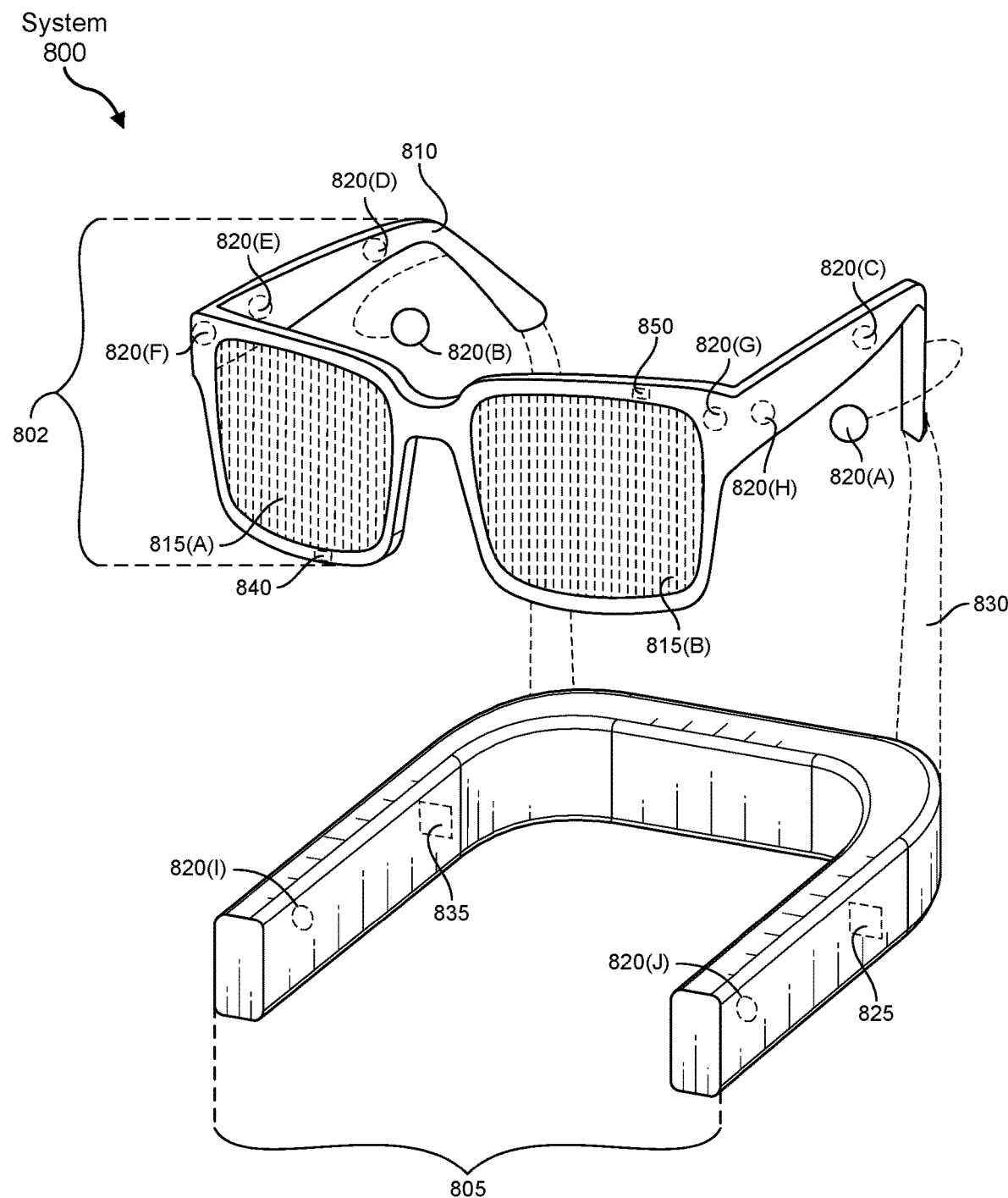
FIG. 8 is an illustration of exemplary augmented-reality glasses that may be used in connection with embodiments of this disclosure.
Figure 9:
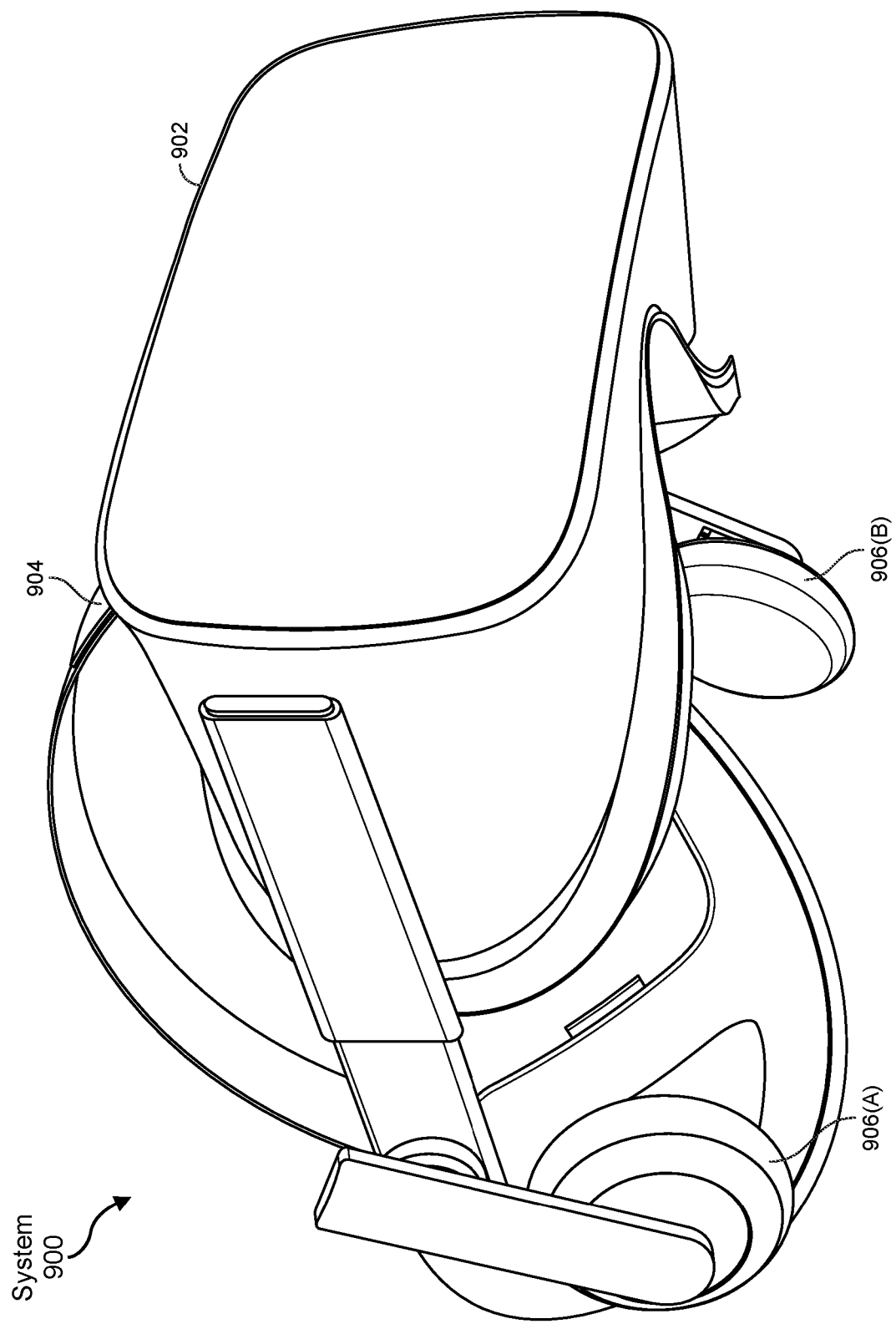
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to an electrode that comprises or includes indium tin oxide include embodiments where an electrode consists essentially of indium tin oxide and embodiments where an electrode consists of indium tin oxide.

What is claimed is:

1. A device comprising:
   a primary electrode comprising a physically continuous structure;
   a secondary electrode overlapping at least a portion of the primary electrode; and
   a liquid crystal layer disposed between the primary electrode and the secondary electrode, wherein:
   the primary electrode comprises a plurality of concentric regions that produce a spatially variable electrical resistance along the primary electrode, wherein the plurality of concentric regions comprises a central region and a plurality of annular regions surrounding the central region; and
   each of the plurality of concentric regions differs from the other concentric regions in at least one of material composition and thickness.

2. The device of claim 1, wherein:
   the electrical resistance of the primary electrode is substantially constant within each respective concentric region; and
   the electrical resistance of the primary electrode is different in each of the plurality of concentric regions.

3. The device of claim 1, wherein the primary electrode is compositionally inhomogeneous.

4. The device of claim 1, wherein the primary electrode comprises a spatially variable doping profile.

5. The device of claim 1, wherein the material composition of the primary electrode is substantially constant within each respective concentric region.

6. The device of claim 1, wherein the primary electrode is optically transparent.

7. The device of claim 1, wherein the primary electrode comprises a transparent conductive oxide.

8. The device of claim 1, wherein:
   the thickness of the primary electrode is different in each of the plurality of concentric regions; and
   the thickness of the primary electrode is substantially constant within each respective concentric region.

9. The device of claim 1, wherein the liquid crystal layer is planar.

10. The device of claim 1, further comprising a dielectric layer disposed between the primary electrode and the liquid crystal layer.

11. The device of claim 10, wherein a dielectric constant of a dielectric material within the dielectric layer is greater than a dielectric constant of a liquid crystal material within the liquid crystal layer.

12. The device of claim 10, wherein the dielectric layer comprises silicon dioxide.

13. The device of claim 1, further comprising a dielectric layer disposed between the secondary electrode and the liquid crystal layer.

14. A liquid lens comprising:
    a liquid crystal layer; and
    a primary electrode disposed over the liquid crystal layer the primary electrode comprising a physically continuous structure, wherein:
    the primary electrode comprises a plurality of concentric regions that produce a spatially variable electrical resistance along the primary electrode, wherein the plurality of concentric regions comprises a central region and a plurality of annular regions surrounding the central region; and
    each of the plurality of concentric regions differs from the other concentric regions in at least one of material composition and thickness.

15. The liquid lens of claim 14, wherein the electrical resistance of the primary electrode varies across a radial dimension of the lens.

16. A method comprising:
    forming a liquid crystal layer; and
    forming a primary electrode comprising a physically continuous structure over the liquid crystal layer, wherein:
    the primary electrode comprises a plurality of concentric regions that produce a spatially variable electrical resistance along the primary electrode, wherein the plurality of concentric regions comprises a central region and a plurality of annular regions surrounding the central region; and each of the plurality of concentric regions differs from the other concentric regions in at least one of material composition and thickness.

17. The method of claim 16, wherein the liquid crystal layer is planar.

18. The method of claim 16, wherein forming the primary electrode comprises ink jet printing.

19. The method of claim 16, further comprising forming a dielectric layer over the liquid crystal layer prior to forming the primary electrode.

* * * * *